(12) United States Patent
Koppich et al.

(10) Patent No.: US 7,111,024 B2
(45) Date of Patent: Sep. 19, 2006

(54) DOCUMENT MANAGEMENT SYSTEM FOR AUTOMATING OPERATIONS PERFORMED ON DOCUMENTS IN DATA STORAGE AREAS

(75) Inventors: George Koppich, Palos Verdes Est., CA (US); Michael Yeung, Mission Viejo, CA (US); Louis Ormond, Irvine, CA (US); Harpreet Singh, Orange, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 353 days.

(21) Appl. No.: 10/269,648

(22) Filed: Oct. 10, 2002

(65) Prior Publication Data

US 2003/0197895 A1 Oct. 23, 2003

Related U.S. Application Data

(63) Continuation-in-part of application No. 10/125,856, filed on Apr. 19, 2002.

(51) Int. Cl.
*G06F 17/30* (2006.01)
(52) U.S. Cl. ............... 707/203; 707/102; 715/513
(58) Field of Classification Search ............ 707/1–10, 707/100–104.1, 200–205; 709/223, 203; 382/205; 715/513
See application file for complete search history.

(56) References Cited

U.S. PATENT DOCUMENTS 5,423,034 A 6/1995 Cohen-Levy et al.
5,666,490 A 9/1997 Gillings et al.

(Continued)

FOREIGN PATENT DOCUMENTS

EP 0 442 054 A2 8/1991

(Continued)

OTHER PUBLICATIONS

Supplemental European Search Report. European Application No. 03 72 6392. Feb. 2, 2006.

(Continued)

*Primary Examiner*—Mohammad Ali
(74) *Attorney, Agent, or Firm*—Tucker, Ellis & West LLP

(57) ABSTRACT

This invention is related to document management systems, and more particularly, to a document management system for automating selected operations to be performed on at least one document in a data storage area. The invention is directed to a method and system for automatically performing preselected operations on electronic documents. The method and system comprising the steps of and means adapted for receiving at least one electronic document into a data storage area accessible by a plurality of users; associating at least one preselected operation with the data storage area, such that such preselected operation is performed automatically by any document received into the data storage area; and performing the preselected operation on each electronic document received into the data storage area.

14 Claims, 3 Drawing Sheets

U.S. PATENT DOCUMENTS

| | | |
|---|---|---|
| 6,009,442 A | 12/1999 | Chen et al. |
| 6,081,810 A | 6/2000 | Rosenzweig et al. |
| 6,088,696 A | 7/2000 | Moon et al. |
| 6,119,137 A | 9/2000 | Smith et al. |
| 6,236,767 B1 * | 5/2001 | Altman ................ 382/305 |
| 6,253,217 B1 | 6/2001 | Dourish et al. |
| 6,370,538 B1 | 4/2002 | Lamping et al. |
| 6,446,072 B1 * | 9/2002 | Schulze et al. ............ 707/10 |
| 6,473,794 B1 * | 10/2002 | Guheen et al. ............ 709/223 |
| 2001/0014908 A1 | 8/2001 | Lo et al. |
| 2001/0056463 A1 * | 12/2001 | Grady et al. ............ 709/203 |

FOREIGN PATENT DOCUMENTS

| | | |
|---|---|---|
| EP | 1 087 306 A2 | 3/2001 |
| WO | WO 02/25927 A1 | 6/2002 |

OTHER PUBLICATIONS

Teege G: "Feature Combination: Position Paper About Composability Issues in Object-Orientation", Proceedings ECOOP. Workshop on Composability Issues on Object-Orientation, Jul. 9, 1996, pp. 1-6, XP002151010.

* cited by examiner

DOCUMENT MANAGEMENT SYSTEM FOR AUTOMATING OPERATIONS PERFORMED ON DOCUMENTS IN DATA STORAGE AREAS

This application is a continuation-in-part of pending U.S. patent application Ser. No. 10/125,856 entitled "Document Management System Rule-Based Automation" filed Apr. 19, 2002, the entirety of which is hereby incorporated by reference.

BACKGROUND OF THE INVENTION

This invention is related to document management systems, and more particularly, to a document management system for automating selected operations to be performed on at least one document in a data storage area.

Enterprises around the world are recognizing that information is the currency of their business. As such, there is tremendous value in ensuring that all corporate information, whether in structured or unstructured formats is captured, managed, and put to work in a meaningful and efficient way. Document management and content management solutions help organizations maximize the use of their unstructured data, which in turn helps maximize the use of their corporate knowledge. Unstructured data is information stored in text files, emails, documents, multimedia, etc.

Document management systems provide organizations with an ability to create centralized repositories, or libraries, containing all of the unstructured data they generate. Powerful search and retrieval tools make this information easily available for use and collaboration across the entire enterprise. These tools often provide security and version control capabilities. However, storing and retrieving large numbers of paper documents has, in the past, been an onerous task. Present document management systems solve some of the problems faced by organizations that use a manual document filing system alongside an electronic document system. These systems provide a method for combining both computer-generated image documents and paper documents in a secure document storage and retrieval system.

Document management systems provide a means for freeing up storage space and reducing the costs of paper document copying and distribution. They often provide multiple methods of adding documents and indexing information to the document management system while facilitating easy revisions, creation of new versions, annotation, and document sharing. One of the most important aspects of document management systems is their ability to eliminate time-consuming physical searches for misfiled or lost documents. Some document management systems allow users to save various types of documents in a single location (i.e. related client emails and Word documents in the same folder). Furthermore, they provide companies with an ability to back up all essential business documents, both scanned and computer-generated, and may integrate optical character recognition ("OCR") technology so that full text searches may be performed on scanned documents.

In popular operating system ("OS") platforms (e.g., Microsoft Windows family), a user navigates the local file system using the integrated OS file management system (e.g., Windows Explorer). Through the use of this tool, documents can be manipulated in a variety of ways, e.g., moved, copied, and deleted. Many computer users have grown accustomed to using integrated file management systems, and are thus reluctant to switch to another file management tool to perform these operations. Document management systems from third-party vendors generally provide enhanced file management systems.

In addition, a benefit of document management systems is that they facilitate collaboration. One such method is providing document distribution functionality so that one user can easily share documents with or send documents to other users, devices or systems. Unfortunately, the document distribution functionality of document management systems generally calls for a user to manually select an appropriate distribution function for each document in the document management system. It would be preferable, however, if document distribution functionality provided users with the ability for automating selected operations to be performed on a plurality of documents in a data storage area.

SUMMARY OF THE INVENTION

In accordance with the present invention, there is provided a document management system with an improved document distribution functionality.

Further, in accordance with the present invention, there is provided a document management system which provides users with the ability for automating selected operations to be performed on at least one document in a data storage area.

Still further, in accordance with the present invention, there is provided a method for automatically performing preselected operations on electronic documents comprising the steps of: receiving at least one electronic document into a data storage area accessible by a plurality of users; associating at least one preselected operation with the data storage area, such that such preselected operation is performed automatically by any document received into the data storage area; and performing the preselected operation on each electronic document received into the data storage area.

Still further in accordance with the present invention, there is provided a system or automatically performing preselected operations on electronic documents comprising: a memory adapted for defining therein a plurality of data storage areas, each of the data storage areas being adapted for storage of electronic documents; means adapted for receiving at least one electronic document into a data storage area accessible by a plurality of users; means adapted for associating at least one preselected operation with the data storage area, such that such preselected operation is performed automatically by any document received into the data storage area; and means adapted for performing the preselected operation on each electronic document received into the data storage area.

Advantages of the document management system of the present invention, include, but are not limited to, an improved document distribution functionality and the ability to automate performing selected operations on at least one document in a data storage area. These and other advantages, aspects, and features will be understood by one of ordinary skill in the art upon reading and understanding the specification.

DETAILED DESCRIPTION OF THE PREFERRED EMBODIMENT

The document management system preferably provides access to a document management repository via a folder incorporated into the existing OS file structure. Although the present invention is described as enabling users to access document management functionality from a Microsoft Windows OS, it will be appreciated to those skilled in the art that the present invention is also suitably designed to interact with any OS, such as Unix, Linux, Macintosh or other OS. In one embodiment, the document management platform ("DMP") provides access to network-based documents via a browser, such as Internet Explorer or Netscape. In the presently preferred embodiment, a document repository managed by the DMP is represented as a folder or data storage area within an Internet Explorer window. The DMP permits a user to perform operations on the repository folder or data storage area, preferably insofar as the user has the appropriate access rights, as will be appreciated by those skilled in the art.

Figure 1:
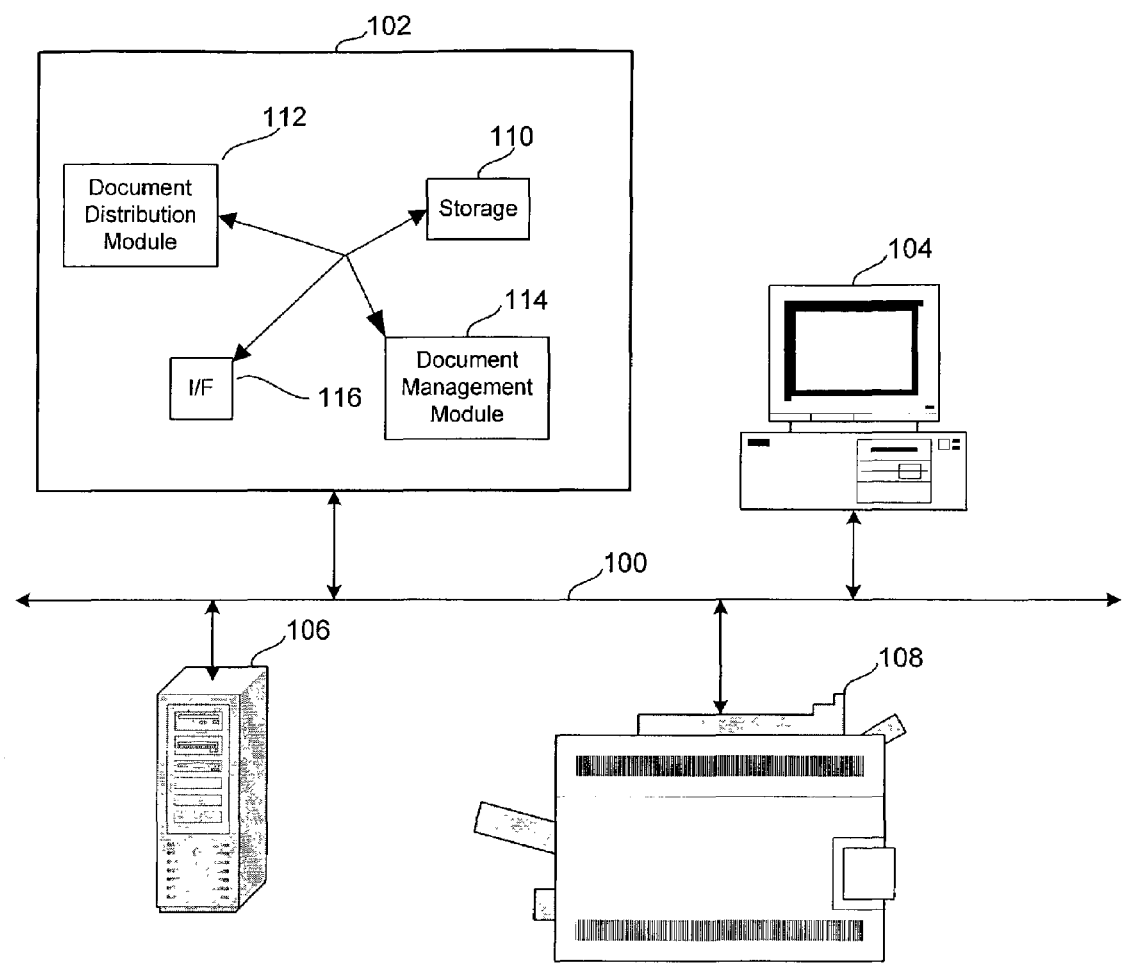
FIG. 1 illustrates an example of a network system for implementing the present invention.

Referring now to FIG. 1, an illustration of a network environment for practicing the present invention is provided. The system comprises a data transport network 100 illustrative of a LAN or WAN environment in which a preferred embodiment is provided, such as a packet-switched TCP/IP-based global communication network. The network 100 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art.

Connected to a data transport network 100 is a document management platform ("DMP") 102. In the presently preferred embodiment, the DMP preferably is a plug-n-play device having a hardware component consisting of a closed-box server that is easy to install, configure and support, and software components, both of which will be described in greater detail hereinbelow.

The DMP is suitably operable to provide services to at least one computer 104, at least one image generating device 108, and/or at least one server 106 connected to network 100. It is suitably a document distribution solution with document management capabilities.

The DMP 102 suitably replaces or supplements existing facsimile, print and electronic mail servers, and preferably offers a more efficient method of transmitting, tracking and storing business-to-business documents. The DMP 102 is preferably a client/server system, which is suitably implemented in both single and collaborative corporate workgroups (although not limited to such environments) and designed to increase productivity and reduce costs by making document communications more simple and reliable. The DMP 102 suitably provides functionality enabling users to share documents and conduct collaborative work between various workgroups. Also connected to data transport network 100 is computer 104. The computer 104 is suitably either a server or client running on any OS, such as Windows NT, Windows 2000, Windows XP, Unix, Linux, Macintosh or other operating system. In addition, the computer 104 is suitably a thick client or thin client, as will be appreciated by those skilled in the art. For example, LAN environment, the DMP 102 provides services from a "thin" browser-based client. The disclosed DMP architecture is suitably accommodating for a "thick client" driver-based computer 104 and for a "thin client" browser-based computer 104.

At least one image generating device 108 is connected to data transport network 100. The image generating device is suitably a device such as a printer, facsimile machine, scanning device, copier, multi-function peripheral ("MFPs"), or other like peripheral devices. The image generating device 108 is suitably any networked image generating device as will be appreciated to one of ordinary skill in the art. The image generating device 108 preferably has an internal device controller suitably acting as a fully functional server with the necessary hardware and software that ensure proper operation of the image generating device as will be appreciated by those skilled in the art. In addition, the image generating device 108 preferably comprises internal storage, which is suitably a hard disk and random access memory ("RAM") as will be appreciated by those skilled in the art.

Optionally, a server 106 is also connected to data transport network. Because both the image generating device and the DMP suitably have server functionality, an additional server is not necessary to practice the present invention. However, corporate networks rarely have only one server, and often have more than two servers, wherein the servers may be configured to perform different tasks. The server 106 is suitably any fully functional server with the necessary hardware and software to ensure proper operation. The server 106 is suitably a database server configured for selective query support, selective data access, data archiving, and the like, an electronic mail server, an application server, or any server configured for performing a function across a network.

The DMP 102 preferably comprises a Document Distribution Module ("DDM") 112 and a Document Management Module ("DMM") 114. It should be noted that the DMP 102 is not limited to these particular modules, and suitably comprises additional modules for device management. The main function of the DMM 114 is to store documents in a central document repository and to facilitate user capability to modify documents, collaborate during document editing, and search and locate stored documents. The main function of the DDM 112 is to route jobs to their destinations such as image generating devices, servers, computers, a document repository, etc.

The DMP 102 also suitably comprises internal storage, in which at least one document repository or data storage area is suitably maintained. The DMP 102 preferably interfaces with data transport network 100 via network interface 116. Thus, the DMP 102, server 106, computer 104 and at least one image generating device 108 are in shared communication.

The computer 104 suitably represents either a thick client or and a thin client with general interfaces to the DMP 102. The computer 104 interfaces with the DDM 112 for document distribution to selected devices. The DDM 112 suitably reports back to the computer 104 the status of the documents forwarded to the DDM 112 for distribution.

The DMM 114 works with the DDM 112 and its components to enable users to quickly store and retrieve documents from a central repository, which is preferably stored in storage 110 on the DMP 102, but is also suitably stored on any storage device in communication with data transport network 100. The repository allows a user to share documents and conduct collaborative work between various workgroups. Users of the DMP 102 preferably utilize a browser-based Graphical User Interface (GUI) from a computer 104 to access documents stored in a repository. The DMP 102 preferably offers support for conventional browsers, e.g., Microsoft Internet Explorer and Netscape Navigator, through an internal web server which is accessible from a thin client via a browser using the HTTP protocol. A WebDAV (Web Distributed Authoring and Versioning) client suitably communicates with the web server utilizing HTTP and WebDAV protocols. WebDAV is a two-way protocol designed to support editing of Web sites and handling of meta data.

When the DMM 114 receives a document in image form, such as it would from a facsimile or scanning device, it suitably routes the image to the repository for storage. The image can also be forwarded to the DDM 112 for further routing to an output device, e.g., a printer. In addition, the image file is also suitably routed to other document management systems ("ODMP") of a remote appliance over the network, and preferably ODMA compliant. A document received via email device is suitably processed as text or an attachment to a message and forwarded to the DMM 114. Both an image and a processed email document can be routed to the printer, repository, and ODMP, and/or other output devices via the DDM 112.

Figure 2:
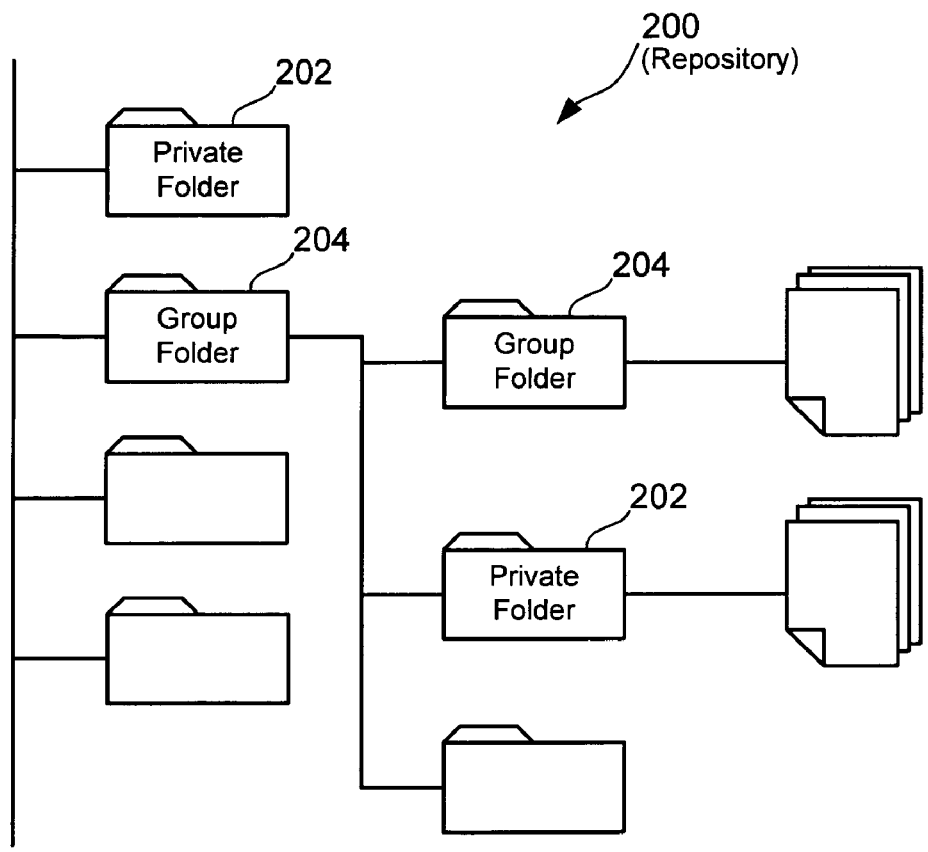
FIG. 2 illustrates a hierarchical tree structure of a repository in a document management system.

Referring now to FIG. 2, there is illustrated a hierarchical folder tree structure of a repository according to the present invention. The repository 200 is suitably comprised of a plurality of file folders or data storage areas. Users can browse through the repository 200 to access file folders and documents through a suitable user interface, preferably a graphical user interface ("GUI") as will be appreciated by one of ordinary skill in the art. Authorized users may suitably create a hierarchical tree by creating new file folders and documents. Each file folder suitably contains both file subfolders and documents. A user is presented with file folders of two types: a private folder 202 and a group folder 204. The private folder 202 allows only the folder owner access this type of file folder. The folder owner has all rights on the objects contained in it. The private folder 202 is suitably created when an Administrator creates the user account. The group folder 204 is visible to users belonging to the group(s) assigned to this file folder. The operations that a user can perform on objects contained in the group folder 204 are limited to the access rights inherited from the respective group.

In one embodiment, the document management system of the present invention also includes a inbox repository or storage area to post incoming scanned image data, facsimiles, printed data, and the like. Such storages areas are suitably personal storage areas for each user or group or shared storage areas. The scanned images, facsimiles, printed data, and the like are posted to such storage areas based on the parameters provided by the user.

The document management system of the present invention allows a user to automate selected operations to be performed on at least one document in a data storage area. In order to perform such operations, the user selects which operations are to be performed. The user is provided the capability to select or define one or more operations to be performed. The user is then provided the opportunity to save the selected operations in a file or script. The script is an ordered sequence of selected operations. The user then associates the script with a selected data storage area. The user identifies the appropriate data storage area by providing selected information about the data storage area in any suitable manner known in the art. Such information includes, but is not limited to, data storage area location, data storage area name, access permission, user name associated with the data storage area, and user name password. The user is suitably either a system user or a guest account. The information provided by the user is then verified, and if so, the user is allowed to then perform the selected operations on the documents within the data storage area. Once the data storage area is selected, documents contained in the data storage area will be automatically processed according to the operations specified in the associated script. Preferably, only one script is associated with a data storage area may be selected for each user. Preferably, more than one data storage area is associated with one script. Preferably, the operations are performed in sequential order corresponding to the order in which the operations were associated with the data storage area. Preferably, scripts may be edited, renamed, deleted, and shared between users in any suitable manner known in the art.

Preferably, the data storage area is selected from a private folder, a group folder, and an electronic inbox.

The selected operations which may be performed on documents in the storage area include, but are not limited to, copying any documents in the data storage area to a selected destination (Copy To), transferring any documents in the data storage area to a selected destination (Move To), converting any documents in the data storage area from a first selected file format to a selected second selected file format (Convert To), performing optical character recognition on any image format documents in the data storage area to convert image format documents to text format (OCR), assigning selected values to metadata fields any documents in the data storage area (Set Metadata), and identifying criteria which must be associated any documents in the data storage area in order for selected operations to be performed on documents (Filter By).

The Copy To operation copies the documents received in the selected data storage area to a specified destination identified by the user. To identify the destination, the user provides selected information about the specified destination in any suitable manner known in the art. Suitable destinations, include, but are not limited to, image generating devices, electronic mail servers, Internet servers, and document management repository. The selected information about the destination is stored in a routing profile record in the document management system.

The Move To operation is similar to the Copy To operation, except that the documents received in the selected data storage area are moved or transferred to a specified destination. To identify the destination, the user provides selected information about the specified destination in any suitable manner known in the art. Suitable destinations, include, but are not limited to, image generating devices, electronic mail servers, Internet servers, and document management repository. The selected information about the destination is stored in a routing profile record in the document management system.

In the Convert To operation, the documents received into the selected data storage area are converted from a first selected file format to a second selected file format. To select the appropriate formats, the user provides information about the formats in any suitable manner known in the art. Preferably, the documents are able to be converted from PS to PDF, from PDF to PS, from PS to txt, from PDF to txt, from PS to TIFF, from PS to JPG, and from PS to BMP. Other types of document conversion, including any digital graphical storage format, are suitably utilized as will be appreciated by one of ordinary skill in the art.

The OCR operation extracts text from image format documents received into the selected data storage area, performs optical character recognition on such documents, and converts them to a text. Suitable image formats include, but are not limited to, PNG, JPG, BMP, and TIFF.

In the Set Metadata operation, selected values are assigned to metadata fields within documents in the data storage area. To select the values for the metadata fields, the user provides selected information in any suitable manner known in the art. The metadata information is stored in a file located in the document management repository.

In the Filter By operation, certain criteria is identified and documents in the data storage area must meet such criteria in order for operations to be performed on the documents. For example, the user can specify that only electronic mail documents will have selected operations performed on the documents. The user provides the selected criteria by any suitable manner known in the art.

In one embodiment, the document management system also includes means adapted for deselecting the designated data storage area so that the selected operations are no longer performed on documents in the data storage area. Until the user deselects the designated document area, all selected operations are performed on documents received into the designated document storage area. At this point, the user may stop the process or select another data storage area for which selected operations are to be performed.

In another embodiment, the document management system includes means adapted for determining whether the selected operations or script can be executed. If the determination is positive, the selected operations are stored in any suitable memory device. If the determination is negative, the user is prompted to edit or revise the script. The revised script is then reviewed to determine if the selected operations can be executed.

In another embodiment, the document management system provides a plurality of data storage areas. In this embodiment, at least one document is received into each data storage area. At least one operation is associated with each data storage area and the at least one operation associated with each data storage area is performed on each document received into the associated data storage area.

Figure 3:
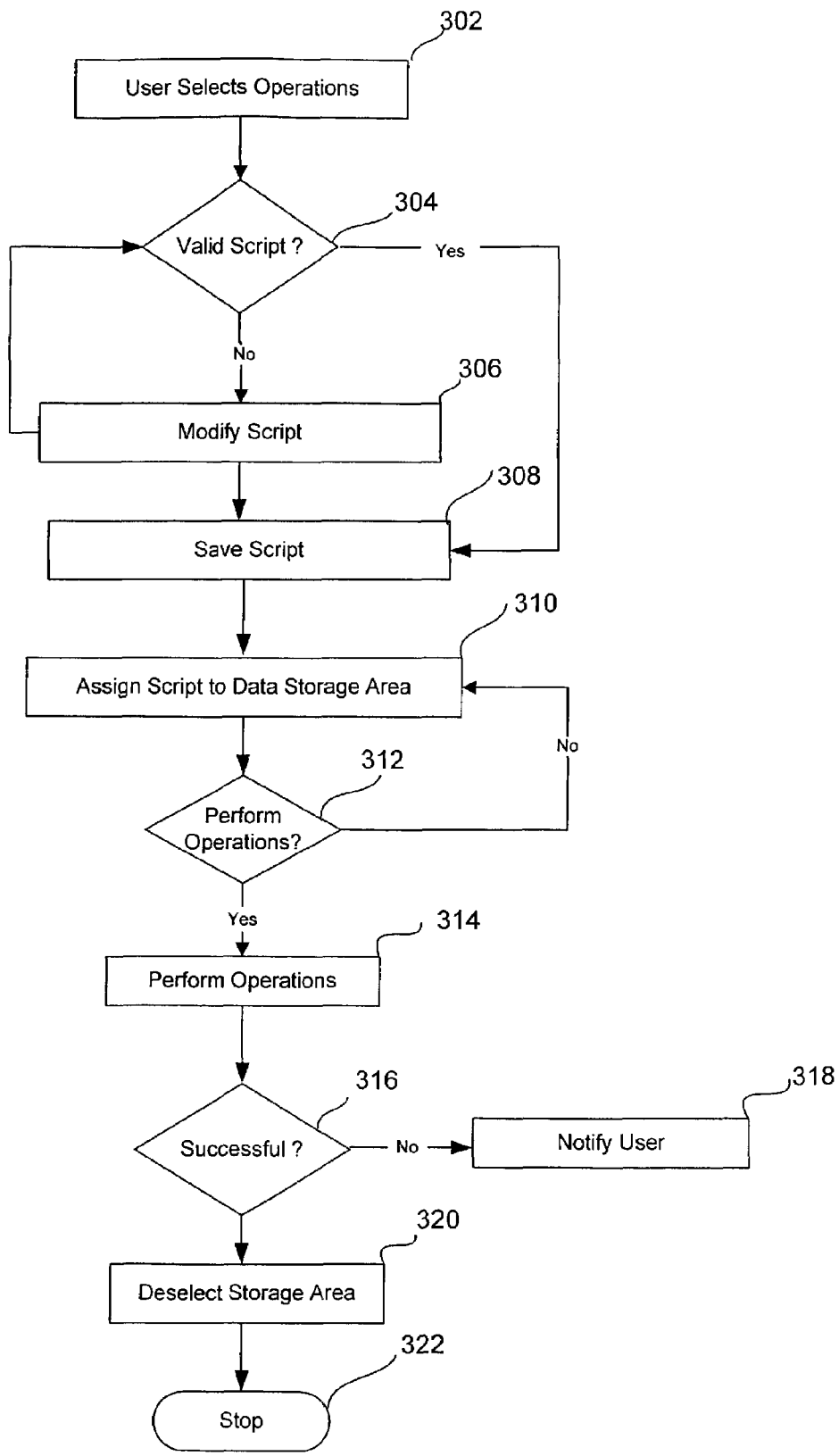
FIG. 3 illustrates an overall block diagram of the subject invention for automating transferring a plurality of documents to at least one data storage area.

Referring now to FIG. 3, there is illustrated a flow chart of the process for performing at least one selected operation on documents received in a selected data storage area according to the present invention. Flow commences at process block 302 where the user selects at least one operation to be performed on documents in a data storage area.

Flow then continues to decision block 304 wherein a determination is made as whether the selected operations can be performed. If the determination is negative, the user is prompted to modify the script as shown at process block 306. The revised script is also analyzed to determine if the selected operations can be performed. If the determination is positive that the original script or the revised script is valid, flow continues to process block 308 wherein the user saves the selected operations in a script.

Flow then proceeds to process block 310 wherein the user selects a data storage area for which the script is to be associated. If the user is not currently authorized to access the data storage area, the DMP 102 prompts a user to provide a username and password to again access. User rights to the folder are suitably assigned by an Administrator in accordance with the level of access provided to that particular user.

Flow then continues to decision block 312 wherein a determination is made whether user wishes to perform the selected operations on documents in the data storage area. A negative determination causes progression to flow back to process block 310 wherein the user maintains access to the repository.

A positive determination at decision block 312 means that the user is attempting to perform the selected operations on documents in the data storage area. At this point, progression flows to process block 314 wherein the selected operations are performed on documents in the data storage area.

Flow then commences to decision block 316 wherein a determination is made as whether the operations were successfully performed. If the determination is negative, the user is notified as shown in process block 318. At this point, the user may elect several options (not shown), such as modifying the script or stopping the process. If the determination is positive, flow then continues to process block 320 wherein the user deselects the selected data storage container so that the selected operations are no longer performed on documents in the document storage area. The user may deselect the data storage area at any time. At this point, the user may select another data storage area to receive documents or stop the process as shown at 322.

Although system as described runs on a network appliance, it is appreciated that it can also run on other operating systems, for example, Linux (and other Unix operating systems), and OS by Apple Computers. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A computer-implemented method for automatically performing at least one preselected operation on electronic documents comprising the steps of:

generating a prompt to an associated user for input of selection data representative of at least one selected document processing operation, including an option to copy an electronic document to at least a second folder;

receiving, from an associated user, selection data representative of at least one selected document processing operation selected from a plurality thereof to be associated with a selected electronic document folder;

generating an icon on an associated graphical user interface, which icon is representative of the selected folder;

associating the at least one selected document processing operation with the folder such that the at least one selected document processing operation is performed automatically on any document received into the folder;

receiving at least one electronic document into the folder by input from an associated user wherein an indicia of the at least one electronic document is associated with the icon via the associated graphical user interface; and commencing the at least one preselected operation on each electronic document received into the folder.

2. The computer-implemented method for automatically performing at least one preselected operation on electronic documents of claim 1 further comprising the step of receiving from an associated user, operation data representative of each preselected operation.

3. The computer-implemented method for automatically performing at least one preselected operation on electronic documents of claim 1 further comprising the step of receiving, from an associated user, an instruction for selectively enabling the at least one preselected document processing operation.

4. The computer-implemented method for automatically performing at least one preselected operation on electronic documents of claim 1 wherein:
the at least one preselected operation includes a document print operation; and
operation data includes data representative of a selected print output for the electronic document.

5. A system for automatically performing at least one preselected operation on electronic documents comprising:
means adapted for generating a prompt to an associated user for input of selection data representative of at least one selected document processing operation, including an option to copy an electronic document to at least a second folder;
means adapted for receiving, from an associated user, selection data representative of at least one selected document processing operation selected from a plurality thereof to be associated with a selected electronic document folder;
means adapted for generating an icon on an associated graphical user interface, which icon is representative of the selected folder;
means adapted for associating the at least one selected document processing operation with the folder such that the at least one selected document processing operation is performed automatically on any document received into the folder;
means adapted for receiving at least one electronic document into the folder by input from an associated user wherein an indicia of the at least one electronic document is associated with the icon via the associated graphical user interface; and
means adapted for commencing the at least one selected operation on each electronic document received into the folder.

6. The system for automatically performing at least one preselected operation on electronic documents of claim 5 further comprising means adapted for receiving from an associated user, operation data representative of each preselected operation.

7. The system for automatically performing at least one preselected operation on electronic documents of claim 5 further comprising means adapted for receiving, from an associated user, an instruction for selectively enabling the at least one preselected document processing operation.

8. The system for automatically performing at least one preselected operation on electronic documents of claim 5 wherein:
the at least one preselected operation includes a document print operation; and
operation data includes data representative of a selected print output for the electronic document.

9. A computer-implemented method for automatically performing at least one preselected operation on electronic documents comprising the steps of:
generating a prompt to an associated user for input of selection data representative of at least one selected document processing operation, including an option to copy an electronic document to at least a second folder;
receiving, from an associated user, selection data representative of at least one selected document processing operation selected from a plurality thereof to be associated with a selected electronic document folder;
generating an icon on an associated graphical user interface, which icon is representative of the selected folder;
associating the at least one selected document processing operation with the folder such that the at least one selected document processing operation is performed automatically on any document received into the folder;
receiving at least one electronic document into the folder by input from an associated user wherein an indicia of the at least one electronic document is associated with the icon via the associated graphical user interface; and
performing the at least one selected operation on each electronic document received into the folder.

10. The computer-implemented method for automatically performing at least one preselected operation on electronic documents of claim 9 further comprising the step of receiving from an associated user, operation data representative of each preselected operation.

11. The computer-implemented method for automatically performing at least one preselected operation on electronic documents of claim 9 wherein:
the at least one preselected operation includes a document print operation; and
operation data includes data representative of a selected print output for the electronic document.

12. A system for automatically performing at least one preselected operation on electronic documents comprising:
means adapted for generating a prompt to an associated user for input of selection data representative of at least one selected document processing operation, including an option to copy an electronic document to at least a second folder;
means adapted for receiving, from an associated user, selection data representative of at least one selected document processing operation selected from a plurality thereof to be associated with a selected electronic document folder;
means adapted for generating an icon on an associated graphical user interface, which icon is representative of the selected folder;
means adapted for associating the at least one selected document processing operation with the folder such that the at least one selected document processing operation is performed automatically on any document received into the folder;
means adapted for receiving at least one electronic document into the folder by input from an associated user wherein an indicia of the at least one electronic document is associated with the icon via the associated graphical user interface; and
means adapted for performing the at least one selected operation on each electronic document received into the folder.

13. The system for automatically performing at least one preselected operation on electronic documents of claim 12 further comprising means adapted for receiving from an associated user, operation data representative of each preselected operation.

14. The system for automatically performing at least one preselected operation on electronic documents of claim 12 wherein:
the at least one preselected operation includes a document print operation; and
operation data includes data representative of a selected print output for the electronic document.

* * * * *